US012717696B2

(12) United States Patent
Kuo et al.

(10) Patent No.: US 12,717,696 B2
(45) Date of Patent: Aug. 25, 2026

(54) TESTING BENCHMARK GENERATION METHOD AND TESTING BENCHMARK GENERATION SYSTEM CAPABLE OF ADJUSTING PROMPT DATA

(71) Applicant: MEDIATEK INC., Hsin-Chu (TW)

(72) Inventors: Wei-Liang Kuo, Hsinchu City (TW); Ming-Yu Hung, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 255 days.

(21) Appl. No.: 18/603,186

(22) Filed: Mar. 12, 2024

(65) Prior Publication Data

US 2024/0311273 A1 Sep. 19, 2024

Related U.S. Application Data

(60) Provisional application No. 63/490,797, filed on Mar. 17, 2023.

(51) Int. Cl.
*G06F 11/3604* (2025.01)

(52) U.S. Cl.
CPC ................................ *G06F 11/3608* (2013.01)

(58) Field of Classification Search
CPC ......................... G06F 11/3608; G06F 11/3684
See application file for complete search history.

(56) References Cited

U.S. PATENT DOCUMENTS 11,500,619 B1 * 11/2022 Abdelaziz ................. G06F 8/33
12,111,751 B2 * 10/2024 Clement ............. G06F 11/3636
2011/0246968 A1 * 10/2011 Zhang ..................... G06F 8/751
717/125
2021/0011696 A1 * 1/2021 Makkar ..................... G06F 8/37
2024/0086164 A1 * 3/2024 Kramer ..................... G06F 8/36

FOREIGN PATENT DOCUMENTS

EP 3021224 B1 * 3/2018 .......... G06F 11/3414

* cited by examiner

*Primary Examiner* — Marina Lee
(74) *Attorney, Agent, or Firm* — Winston Hsu

(57) ABSTRACT

A testing benchmark generation method includes providing a product, generating prompt data of the product by a prompt generation module, generating a code snippet by a large language model according to the prompt data, semantically checking the code snippet by an inference module for determining if the code snippet is successfully verified, compiling the code snippet and executing the code snippet to drive the product after the code snippet is successfully verified, analyzing an execution result corresponding to the code snippet after the code snippet is executed under the product, comparing the execution result corresponding to the code snippet with at least one constraint of the product by a profiling module for determining if the code snippet matches the at least one constraint, and adding the code snippet to testing benchmark data of a testing benchmark generation module.

20 Claims, 5 Drawing Sheets

TESTING BENCHMARK GENERATION METHOD AND TESTING BENCHMARK GENERATION SYSTEM CAPABLE OF ADJUSTING PROMPT DATA

CROSS REFERENCE TO RELATED APPLICATIONS

This application claims the benefit of U.S. Provisional Application No. 63/490,797, filed on Mar. 17, 2023. The content of the application is incorporated herein by reference.

BACKGROUND

With the rapid development of science and technology, an increasing number of companies and research institutions look for efficient and professional testing benchmarks to evaluate their product performance. However, conventional testing benchmarks may not cover all specific hardware and software architectures since the conventional testing benchmarks are user-defined or generated by credible institutions.

Therefore, developing a benchmark generation method capable of applying to various hardware and software architectures is an important research issue.

SUMMARY

In an embodiment of the present invention, a testing benchmark generation method is disclosed. The testing benchmark generation method comprises providing a product, generating prompt data of the product by a prompt generation module, generating a code snippet by a large language model (LLM) according to the prompt data, semantically checking the code snippet by an inference module for determining if the code snippet is successfully verified, compiling the code snippet and executing the code snippet to drive the product after the code snippet is successfully verified, analyzing an execution result corresponding to the code snippet after the code snippet is executed under the product, comparing the execution result corresponding to the code snippet with at least one constraint of the product by a profiling module for determining if the code snippet matches the at least one constraint, and adding the code snippet to testing benchmark data of a testing benchmark generation module. The product comprises a hardware-product or a software-product.

In another embodiment of the present invention, a testing benchmark generation system is disclosed. The testing benchmark generation system comprises a prompt generation module, an inference module, a profiling module, a prompt adjustment module, and a testing benchmark generation module. The prompt generation module is configured to generate prompt data. The inference module is coupled to the prompt generation module and configured to generate and check a code snippet. The profiling module is coupled to the inference module and a product and configured to analyze an execution result of the code snippet operated under the product. The testing benchmark generation module is coupled to the profiling module and configured to generate testing benchmark data. After the prompt generation module generates the prompt data of the product, the inference module generates the code snippet by LLM according to the prompt data. The inference module semantically checks the code snippet for determining if the code snippet is successfully verified. The inference module compiles the code snippet and executes the code snippet to drive the product after the code snippet is successfully verified. The profiling module analyzes the execution result corresponding to the code snippet after the code snippet is executed under the product. The profiling module compares the execution result corresponding to the code snippet with at least one constraint of the product for determining if the code snippet matches the at least one constraint. The profiling module adds the code snippet to the testing benchmark data of the testing benchmark generation module. The product comprises a hardware-product or a software-product.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
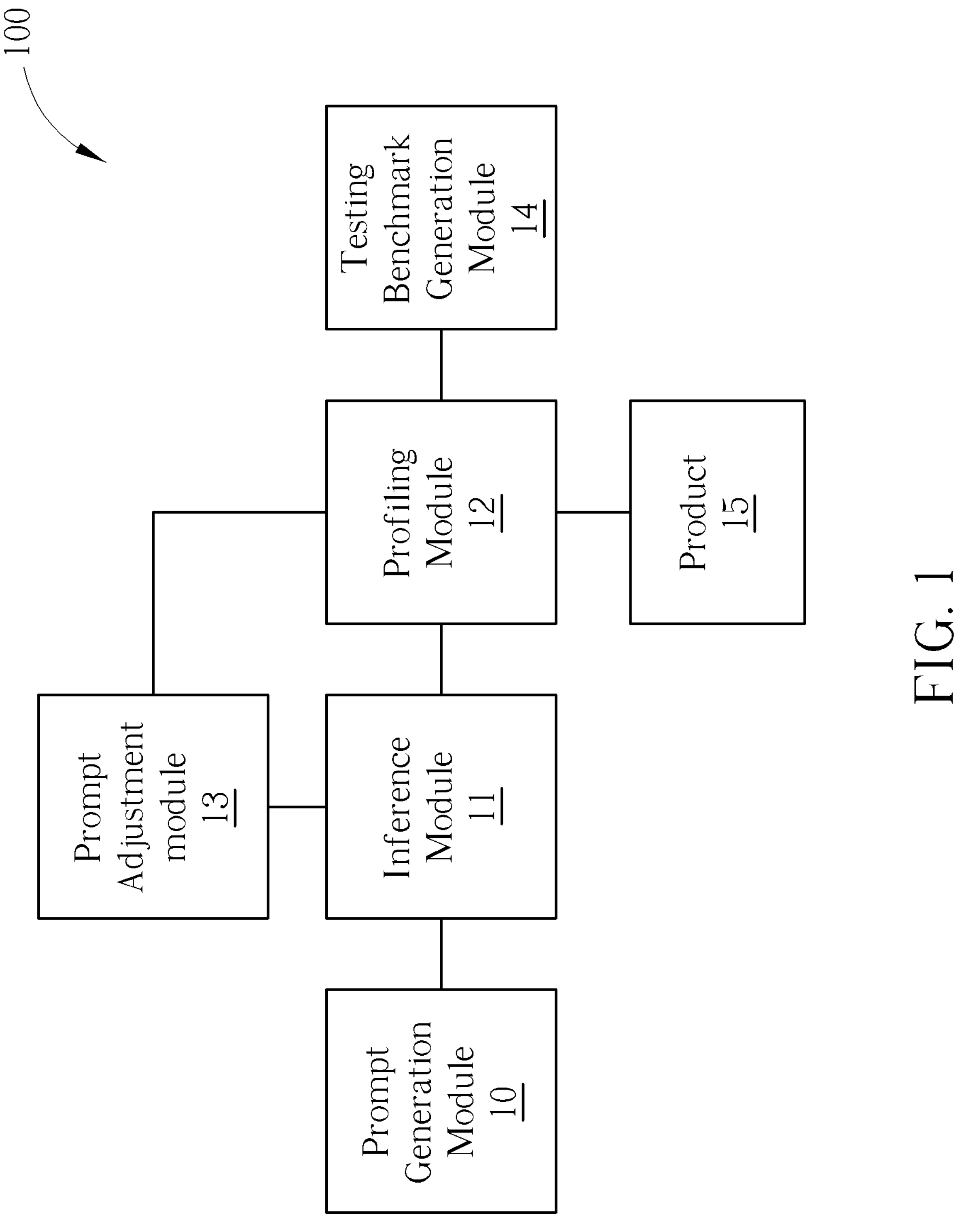
FIG. 1 is a block diagram of a testing benchmark generation system according to an embodiment of the present invention.

FIG. 1 is a block diagram of a testing benchmark generation system 100 according to an embodiment of the present invention. The testing benchmark generation system includes a prompt generation module 10, an inference module 11, a profiling module 12, a prompt adjustment module 13, and a testing benchmark generation module 14. The prompt generation module is used for generating prompt data. The inference module 11 is coupled to the prompt generation module 10 for generating and checking a code snippet. The profiling module 12 is coupled to the inference module 11 and a product 15 for analyzing an execution result of the code snippet operated under the product 15. The prompt adjustment module 13 is coupled to the inference module 11 and the profiling module 12 for adjusting the prompt data. The testing benchmark generation module 14 is coupled to the profiling module 12 for generating testing benchmark data. In the testing benchmark generation system 100, after the prompt generation module 10 generates the prompt data of the product 15, the inference module 11 generates the code snippet by a large language model (LLM) according to the prompt data. Here, the LLM can be an artificial intelligence (AI) accelerator-based language model. For example, the LLM can be a Generative Pre-training Transformer (GPT) language model. The inference module 11 can semantically check the code snippet for determining if the code snippet is successfully verified. Then, the profiling module 12 analyzes the execution result corresponding to the code snippet after the code snippet is executed under the product 15. The profiling module 12 compares the execution result corresponding to the code snippet with at least one constraint of the product 15 for determining if the code snippet matches the at least one constraint. Then, the profiling module 12 adds the code snippet to the testing benchmark data of the testing benchmark generation module 14. The testing benchmark generation module 14 can be a memory for buffering and updating the testing benchmark data. In other words, the testing benchmark generation system 100 can generate appropriate code snippets to form the testing benchmark data for applying to various software and hardware architectures. Here, the product 15 can include a hardware-product or a software-product. Operation details of the testing benchmark generation system 100 are illustrated below.

Figure 2:
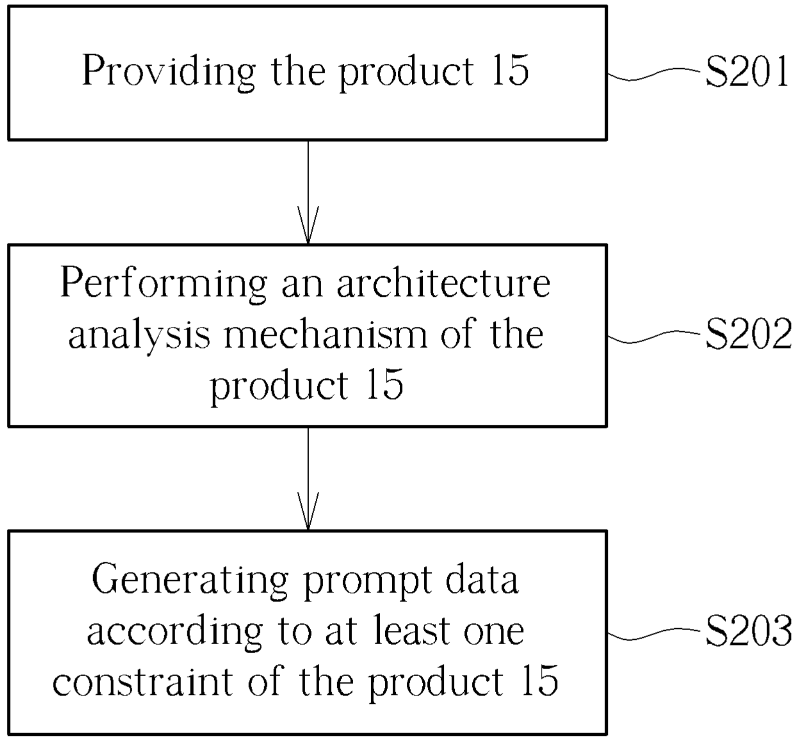
FIG. 2 is a flow chart of a prompt generation process performed by a prompt generation module of the testing benchmark generation system in FIG. 1.

FIG. 2 is a flow chart of a prompt generation process performed by a prompt generation module 10 of the testing benchmark generation system 100. The prompt generation process can include step S201 to step S203. Any reasonable technology modification falls into the scope of the present invention. Step S201 to step S203 are illustrated below.

step S201: providing the product 15;

step S202: performing an architecture analysis mechanism of the product 15;

step S203: generating prompt data according to at least one constraint of the product 15.

In step S201, the product 15 is provided. As previously mentioned, the product 15 can be the hardware-product or the software-product. In the testing benchmark generation system 100, when the product 15 is the hardware-product, the testing benchmark data can be used for profiling hardware performance. When the product 15 includes the software-product, the testing benchmark data can be used for testing robustness of a complier corresponding to the software-product. Then, in step S202, the prompt generation module 10 can perform an architecture analysis mechanism of the product 15. For example, the prompt generation module 10 can automatically analyze the product 15 according to its features, properties, behaviors, and/or characteristics. Alternatively, the prompt generation module 10 can be used for analyzing the product 15. Then, the prompt generation module 10 can generate prompt data according to at least one constraint of the product 15. For example, the at least one constraint can be related to CPU performance of CoreMark or Geekbench. Here, the prompt data can be generated according to task description data, code snippet format data, constraint data, and few-shot learning data. The task description data is generated according to hardware or software architectures. The task description data can be used for determining which code snippets are generated for testing the product 15. The code snippet format data is used for determining coding formats generated by the LLM. The constraint data can be used for illustrating constraints of the code snippets generated by the LLM. The few-shot learning data can be sample data or experimental data optionally introduced to the prompt data. In step S203, the prompt generation module 10 can generate prompt data according to at least one constraint of the product 15. Here, the prompt data can be in a form of text data. The prompt data is inputted to the LLM for generating the code snippet corresponding to each testing item of the product 15.

Figure 3:
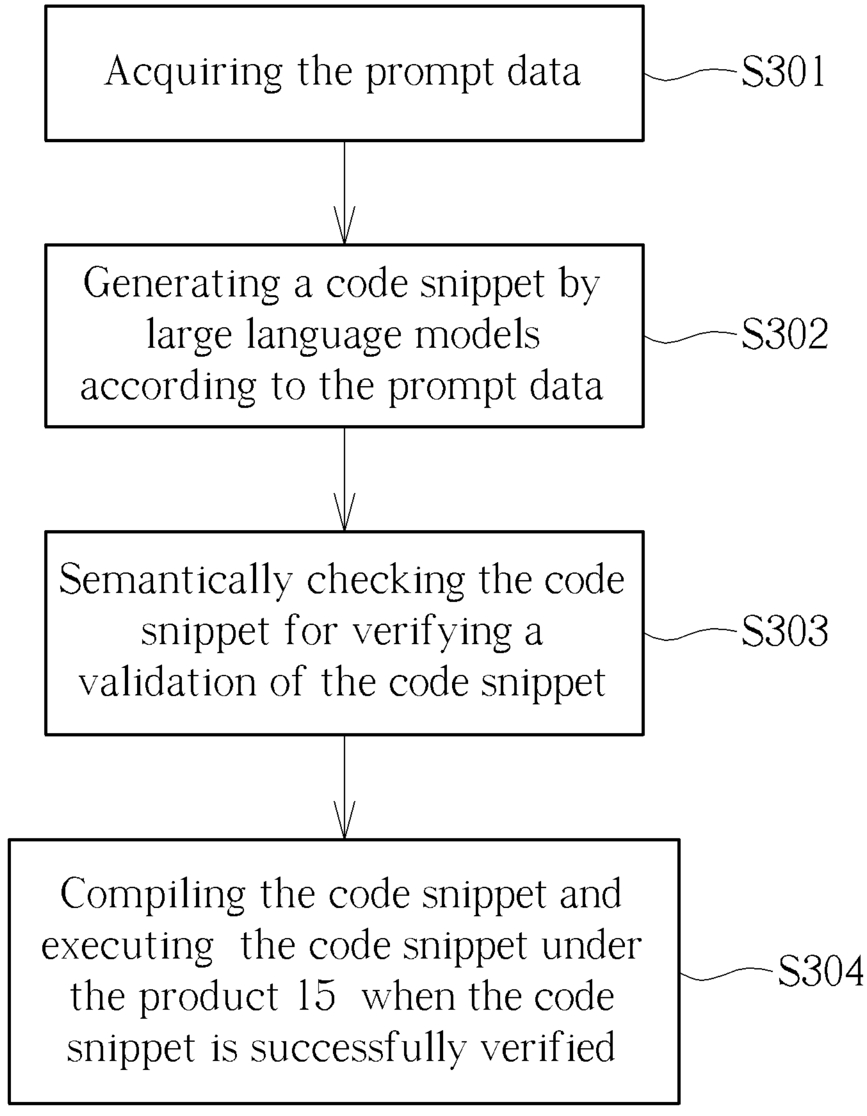
FIG. 3 is a flow chart of an inference process performed by an inference module of the testing benchmark generation system in FIG. 1.

FIG. 3 is a flow chart of an inference process performed by the inference module 11 of the testing benchmark generation system 100. The inference process can include step S301 to step S304. Any reasonable technology modification falls into the scope of the present invention. Step S301 to step S304 are illustrated below.

step S301: acquiring the prompt data;

step S302: generating the code snippet by the LLM according to the prompt data;

step S303: semantically checking the code snippet for verifying a validation of the code snippet;

step S304: compiling the code snippet and executing the code snippet under the product 15 when the code snippet is successfully verified.

In step S301, the inference module 11 acquires the prompt data from the prompt generation module 10. Then, in step S302, the code snippet can be generated by the LLM according to the prompt data. After the code snippet is generated, the inference module 11 can semantically check the code snippet for verifying a validation of the code snippet in step S303. For example, the inference module 11 can check the code snippet for determining if a code semantics format of the code snippet satisfies a designated programming language. Then, the inference module 11 can acquire a check result of the code semantics format for determining if the code snippet is successfully verified. In step S304, when the code snippet is successfully verified, it implies that the code snippet is valid. Then, the code snippet can be compiled and executed under the product 15.

Figure 4:
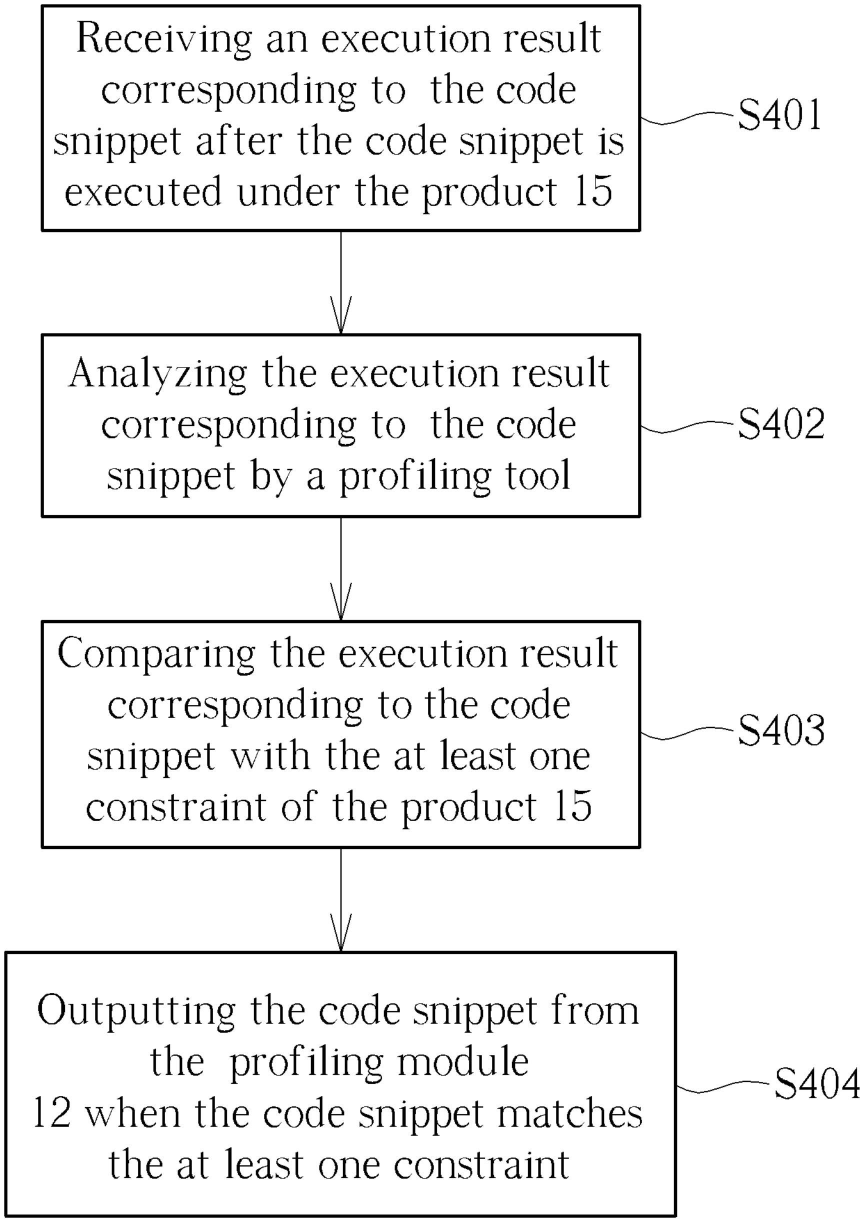
FIG. 4 is a flow chart of a profiling process performed by a profiling module of the testing benchmark generation system in FIG. 1.

FIG. 4 is a flow chart of a profiling process performed by the profiling module 12 of the testing benchmark generation system 100. The profiling process can include step S401 to step S404. Any reasonable technology modification falls into the scope of the present invention. Step S401 to step S404 are illustrated below.

step S401: receiving an execution result corresponding to the code snippet after the code snippet is executed under the product 15;

step S402: analyzing the execution result corresponding to the code snippet by a profiling tool;

step S403: comparing the execution result corresponding to the code snippet with the at least one constraint of the product 15;

step S404: outputting the code snippet from the profiling module 12 when the code snippet matches the at least one constraint.

In step S401, the profiling module 12 can receive the execution result corresponding to the code snippet from the inference module 11 after the code snippet is executed under the product 15. Then, in step S402, the profiling module 12 can analyze the execution result corresponding to the code snippet by a profiling tool. Here, the profiling tool can automatically analyze the execution result corresponding to the code snippet. Alternatively, the profiling tool can be used for analyzing the execution result corresponding to the code snippet. In step S403, the profiling module 12 can compare the execution result corresponding to the code snippet with the at least one constraint of the product 15. If the execution result meets the at least one constraint, it implies that the code snippet corresponds to a preconfigured testing item of the product 15. Therefore, in step S404, the profiling module 12 can output the code snippet to the testing benchmark generation module 14 for adding the code snippet to the testing benchmark data when the code snippet matches the at least one constraint. In other words, an "appropriate" code snippet can be introduced to the testing benchmark data. Therefore, the testing benchmark data of the testing benchmark generation system 100 can be applied to various hardware and software architectures.

Figure 5:
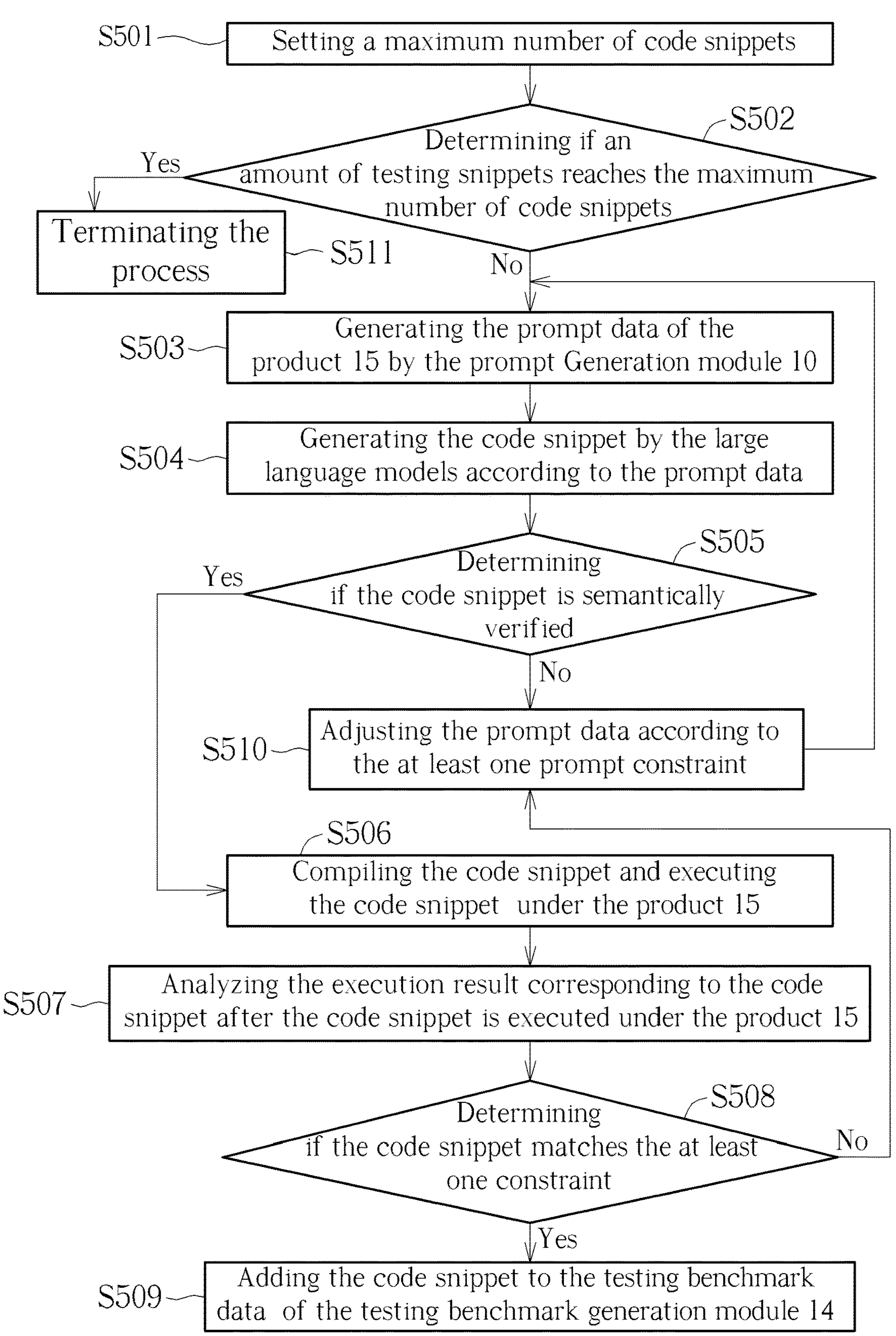
FIG. 5 is a flow chart of a testing benchmark generation method performed by a testing benchmark generation system in FIG. 1.

FIG. 5 is a flow chart of a testing benchmark generation method performed by the testing benchmark generation system 100. The testing benchmark generation method can include step S501 to step S511. Any reasonable technology modification falls into the scope of the present invention. Step S501 to step S511 are illustrated below.

step S501: setting a maximum number of code snippets;

step S502: determining if an amount of testing snippets has reached the maximum number of code snippets, if yes, entering step S511, else, entering step S503;

step S503: generating the prompt data of the product 15 by the prompt generation module 10;

step S504: generating the code snippet by the LLM according to the prompt data;

step S505: semantically checking the code snippet by the inference module 11 for determining if the code snippet is successfully verified, if yes, entering step S506, else, entering step S510;

step S506: compiling the code snippet and executing the code snippet under the product 15;

step S507: analyzing the execution result corresponding to the code snippet after the code snippet is executed under the product 15;

step S508: comparing the execution result corresponding to the code snippet with the at least one constraint of the product 15 by the profiling module 12 for determining if the code snippet matches the at least one constraint, if yes, entering step S509, else, entering step S510;

step S509: adding the code snippet to the testing benchmark data of the testing benchmark generation module 14.

step S510: adjusting the prompt data according to the at least one prompt constraint and entering step S503;

step S511: terminating the process.

In step S501, the testing benchmark generation system 100 can set a maximum number of code snippets. Then, in step S502, the amount of testing snippets can be compared with the maximum number of code snippets for determining if the amount of testing snippets has reached than the maximum number of code snippets. If the amount of testing snippets has reached the maximum number of code snippets, it implies the process is completed. Therefore, in step S511, the testing benchmark generation process is terminated. If the amount of testing snippets is smaller than the maximum number of code snippets, then in step S503, the prompt data of the product 15 can be generated by the prompt generation module 10. In step S504, the code snippet can be generated by the LLM according to the prompt data. In step S505, the inference module 11 semantically checks the code snippet for determining if the code snippet is successfully verified. If semantics of the code snippet is successfully verified, step S506 can be performed. If the semantic verification of the code snippet fails, it implies that the code snippet is invalid or inappropriate. Therefore, in step S510, the prompt adjustment module 13 can adjust the prompt data according to the at least one constraint and re-enters step S503. Therefore, the prompt data can be updated by the prompt generation module 10. In step S506, the code snippet can be compiled and executed under the product 15. In step S507, the profiling module 12 can analyze the execution result corresponding to the code snippet after the code snippet is executed under the product 15. In step S508, the profiling module 12 can compare the execution result corresponding to the code snippet with the at least one constraint of the product 15 for determining if the code snippet matches the at least one constraint. In the code snippet matches the at least one constraint according to the execution result, it implies that the code snippet can be introduced to the testing benchmark data. Therefore, in step S509, the code snippet can be added to the testing benchmark data of the testing benchmark generation module 14. If the code snippet and the at least one constraint are mismatched, then in step S510, the prompt adjustment module 13 can adjust the prompt data according to the at least one constraint and re-enters step S503. Therefore, the prompt data can be updated by the prompt generation module 10. In the testing benchmark generation system 100, by using a two-step verification mechanism (i.e., step S505 and step S508), since the prompt data can be dynamically adjusted, the code snippet can be optimized. Since the "optimized" code snippet can be added to the testing benchmark data of the testing benchmark generation module 14 in each processing loop, the testing benchmark data can be generated by the testing benchmark generation module 14 according to a plurality of "optimized" code snippets.

In the testing benchmark generation system 100, any technology modification falls into the scope of the present invention. For example, the prompt adjustment module 13 can "automatically" adjust the prompt data. The testing benchmark generation system 100 can set a maximum number of adjusting the prompt data. Then, an amount of adjusting the prompt data can be compared with the maximum number of adjusting the prompt data. If the amount of adjusting the prompt data reaches the maximum number of adjusting the prompt data, it implies that current prompt data cannot be adjusted automatically. Therefore, the prompt generation module 10 can be reset for generating the prompt data.

To sum up, the present invention discloses a testing benchmark generation method and a testing benchmark generation system. The testing benchmark generation system can systematically generate optimal testing benchmark data by dynamically adjusting the prompt data. Further, the testing benchmark generation system can use the two-step verification mechanism for filtering out inappropriate code snippets. Therefore, the testing benchmark data generated by the testing benchmark generation system can be used for applying to various hardware and software architectures.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A testing benchmark generation method comprising:

providing a product;

generating prompt data of the product by a prompt generation module;

generating a code snippet by a large language model (LLM) according to the prompt data;

semantically checking the code snippet by an inference module for determining if the code snippet is successfully verified;

compiling the code snippet and executing the code snippet to drive the product after the code snippet is successfully verified;

analyzing an execution result corresponding to the code snippet after the code snippet is executed under the product;

comparing the execution result corresponding to the code snippet with at least one constraint of the product by a profiling module for determining if the code snippet matches the at least one constraint; and adding the code snippet to testing benchmark data of a testing benchmark generation module.

2. The method of claim 1, further comprising:
adjusting the prompt data according to the at least one constraint when a semantic verification of the code snippet fails; and
updating the prompt data after the prompt data is adjusted.

3. The method of claim 1, further comprising:
adjusting the prompt data according to the at least one constraint when the code snippet and the at least one constraint are mismatched; and
updating the prompt data after the prompt data is adjusted.

4. The method of claim 1, further comprising:
setting a maximum number of code snippets;
comparing an amount of testing snippets with the maximum number of code snippets; and
terminating a testing benchmark generation process if the amount of testing snippets reaches the maximum number of code snippets.

5. The method of claim 1, wherein the prompt data is generated according to task description data, code snippet format data, constraint data, and few-shot learning data.

6. The method of claim 1, further comprising:
setting a maximum number of adjusting the prompt data;
comparing an amount of adjusting the prompt data with the maximum number of adjusting the prompt data; and
resetting the prompt generation module for generating the prompt data if the amount of adjusting the prompt data reaches the maximum number of adjusting the prompt data.

7. The method of claim 1, wherein the testing benchmark data is generated by the testing benchmark generation module according to a plurality of code snippets, and the code snippet corresponds to each testing item of the product.

8. The method of claim 1, wherein semantically checking the code snippet by the inference module for determining if the code snippet is successfully verified comprises:
checking the code snippet by the inference module for determining if a code semantics format of the code snippet satisfies a designated programming language; and
acquiring a check result of the code semantics format for determining if the code snippet is successfully verified.

9. The method of claim 1, wherein the prompt data is a text data format, the LLM is an artificial intelligence (AI) accelerator-based language model, and the prompt data is inputted to the LLM for generating the code snippet corresponding to each testing item of the product.

10. The method of claim 1, wherein when the product comprises the hardware-product, the testing benchmark data is used for profiling hardware performance, or when the product comprises the software-product, the testing benchmark data is used for testing robustness of a complier corresponding to the software-product.

11. A testing benchmark generation system comprising:
a prompt generation module configured to generate prompt data;
an inference module coupled to the prompt generation module and configured to generate and check a code snippet;
a profiling module coupled to the inference module and a product and configured to analyze an execution result of the code snippet operated under the product;
a prompt adjustment module coupled to the inference module and the profiling module and configured to adjust the prompt data; and
a testing benchmark generation module coupled to the profiling module and configured to generate testing benchmark data;
wherein the prompt generation module performs an architecture analysis mechanism of the product for generating the prompt data according to at least one constraint of the product;
wherein the testing benchmark generation module is a memory for buffering and updating the testing benchmark data; and
wherein after the prompt generation module generates the prompt data of the product, the inference module generates the code snippet by a large language model (LLM) according to the prompt data, the inference module semantically checks the code snippet for determining if the code snippet is successfully verified, the inference module compiles the code snippet and executes the code snippet to drive the product after the code snippet is successfully verified, the profiling module analyzes the execution result corresponding to the code snippet after the code snippet is executed under the product by a profiling tool, the profiling module compares the execution result corresponding to the code snippet with at least one constraint of the product for determining if the code snippet matches the at least one constraint, and the profiling module adds the code snippet to the testing benchmark data of the testing benchmark generation module.

12. The system of claim 11, wherein the prompt adjustment module adjusts the prompt data according to the at least one constraint when a semantic verification of the code snippet fails, and the prompt data is updated after the prompt data is adjusted.

13. The system of claim 11, wherein the prompt adjustment module adjusts the prompt data according to the at least one constraint when the code snippet and the at least one constraint are mismatched, and the prompt data is updated after the prompt data is adjusted.

14. The system of claim 11, wherein after a maximum number of code snippets is configured, an amount of testing snippets is compared with the maximum number of code snippets, and if the amount of testing snippets reaches the maximum number of code snippets, a testing benchmark generation process is terminated.

15. The system of claim 11, wherein the prompt data is generated according to task description data, code snippet format data, constraint data, and few-shot learning data.

16. The system of claim 11, wherein after a maximum number of adjusting the prompt data is configured, an amount of adjusting the prompt data is compared with the maximum number of adjusting the prompt data, and if the amount of adjusting the prompt data reaches the maximum number of adjusting the prompt data, the prompt generation module is reset for generating the prompt data.

17. The system of claim 11, wherein the testing benchmark data is generated by the testing benchmark generation module according to a plurality of code snippets, and the code snippet corresponds to each testing item of the product.

18. The system of claim 11, wherein the inference module checks the code snippet for determining if a code semantics format of the code snippet satisfies a designated programming language, and the inference module acquires a check result of the code semantics format for determining if the code snippet is successfully verified.

19. The system of claim 11, wherein the prompt data is a text data format, the LLM is an artificial intelligence (AI) accelerator-based language model, and the prompt data is inputted to the LLM for generating the code snippet corresponding to each testing item of the product.

20. The system of claim 11, wherein when the product comprises the hardware-product, the testing benchmark data is used for profiling hardware performance, or when the product comprises the software-product, the testing benchmark data is used for testing robustness of a complier corresponding to the software-product.

* * * * *